United States Patent [19]

Bentivegna

[11] 3,934,847
[45] Jan. 27, 1976

[54] RESCUE CAPSULE FOR USE WITH A HELICOPTER

[76] Inventor: Pasquale P. Bentivegna, 56 Gladstone St., East Boston, Mass. 02128

[22] Filed: Oct. 4, 1974

[21] Appl. No.: 511,734

[52] U.S. Cl. .................. 244/137 P; 9/14; 182/142
[51] Int. Cl.² ........................................... B64C 1/22
[58] Field of Search ......... 244/137 R, 137 P, 138 R; 9/14; 61/69 R, 69 A; 14/71; 182/142, 150

[56] References Cited
UNITED STATES PATENTS
1,027,724 5/1912 Haney ............................... 14/71 X
2,991,489 7/1961 Kubach ........................ 61/69 R X FOREIGN PATENTS OR APPLICATIONS
1,812,118 8/1970 Germany ....................... 244/137 P
755,965 8/1956 United Kingdom ............ 244/137 R Primary Examiner—George E. A. Halvosa
Assistant Examiner—Barry L. Kelmachter
Attorney, Agent, or Firm—Wolf, Greenfield & Sacks

[57] ABSTRACT

A helicopter has a fuselage with a floor that has an opening therethrough. A rescue capsule is operably connected to the helicopter by cables and winches, and it has a projecting guide member that enters the floor opening to correctly align and stabilize the connection between the capsule and the helicopter. A bridge movably connected to the capsule provides egress between the latter and a building or other structure occupied by persons in need of rescue.

7 Claims, 5 Drawing Figures

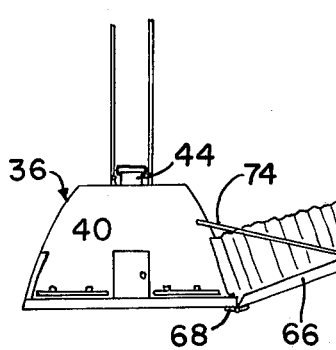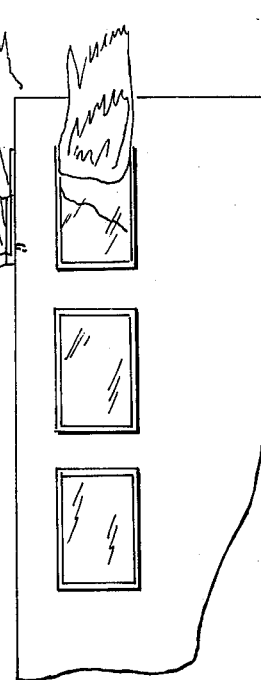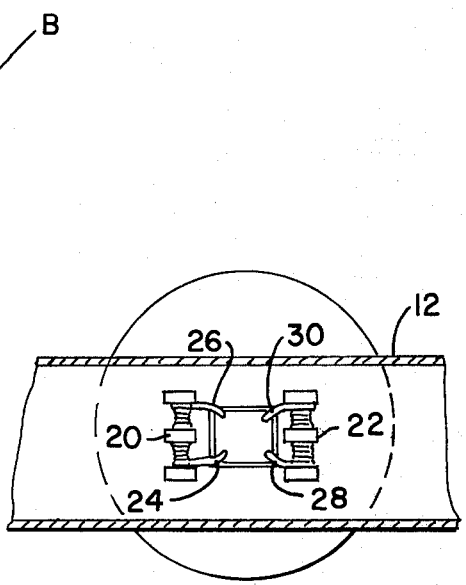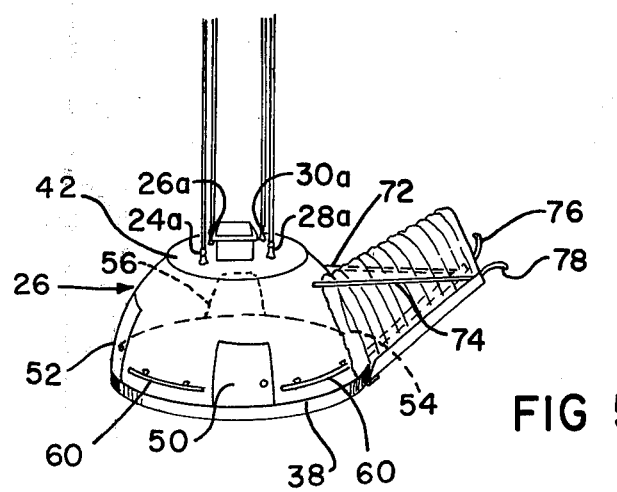

RESCUE CAPSULE FOR USE WITH A HELICOPTER

My principal object is to provide rescue means that can be moved to places such as the top or side of a high building, boats at sea and the like, that rescue apparatus now available cannot reach. Another object is to provide the power to effect such rescue with the use of a wellknown helicopter, by supplying connecting means whereby my capsule may be maneuvered to whatever position is most favorable to effect the rescue of persons in danger.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the cnstruction disclosed by the drawings nor to the particular parts described in the specification; but am entitled to all such changes therefrom as fall within the scope of my invention.

In the drawings:

FIG. 3 is a side elevational view showing my rescue capsule adjacent a burning building and a bridge extending from the capsule to the building.

FIG. 4 is an enlarged, sectional view taken on the line 4—4 of FIG. 2.

FIG. 5 is a perspective view showing my capsule with a covered bridge connected thereto in position of use.

Figure 1:
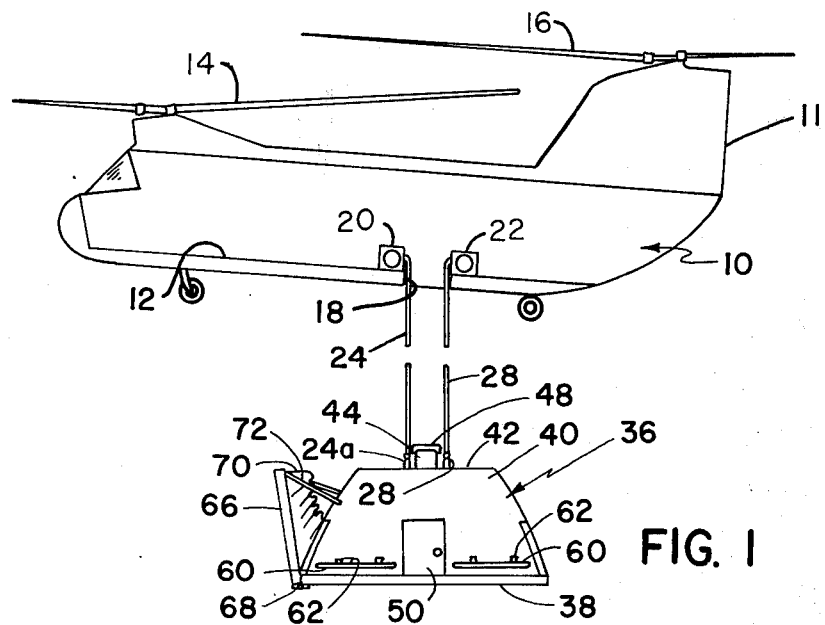
FIG. 1 is a diagrammatic view showing my rescue capsule connected to a helicopter and so positioned with relation to a burning building that it can be moved to a point where persons in the building may be rescued.
Figure 2:
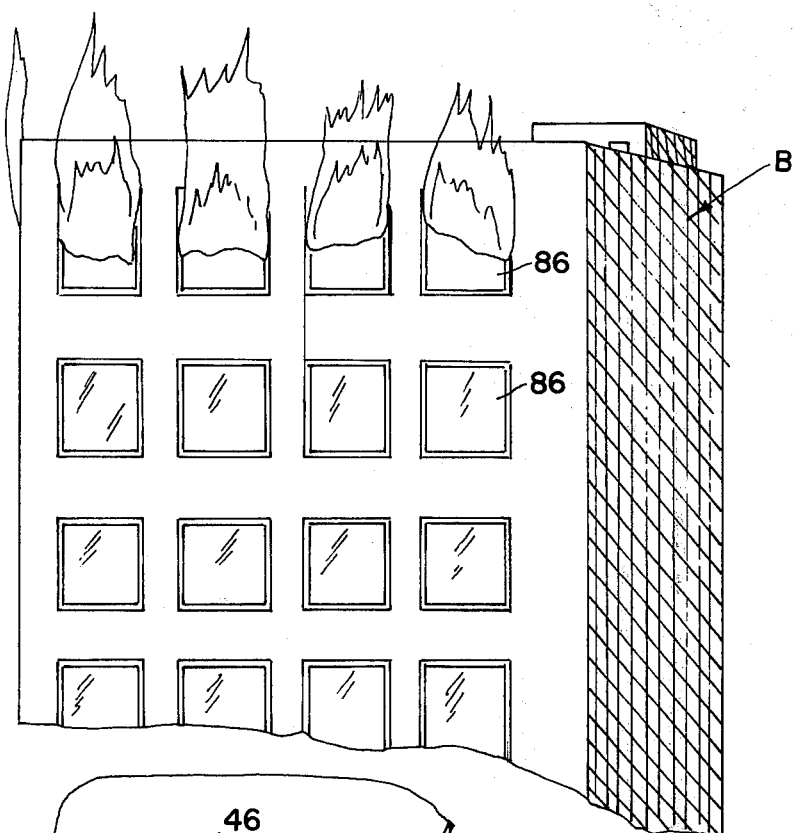
FIG. 2 is a fragmentary, sectional view, on a reduced scale showing my rescue capsule held firmly to a helicopter.
Figure 2:
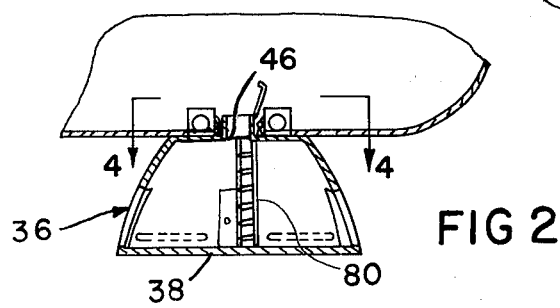

As illustrated, a well-known helicopter 10 has a fuselage 11 with a floor 12 and the usual propellers 14 and 16. Said floor 12 is provided with an opening 18 and adjacent thereto at opposite sides are two double spindle winches 20 and 22. Cables 24 and 26 travel over the spindles of winch 20, and cables 28 and 30 travel over the spindles of winch 22.

A rescue capsule 36 is carried by said helicopter, as shown in said FIG. 1. It has a floor 38 from which a side 40 extends upwardly to a top 42. A projecting guide 44 is attached to and extends from the latter upwardly through a hatch opening 46 in the top and which is provided with a cover 48. Doors 50, 52, 54, and 56 are provided in said side 40. Said cables 24, 26, 28 and 30 are respectively attached to said top 42 by well-known fasteners 24a, 26a, 28a, and 30a, which are shown as hooks set in said top.

Safety rails 60 are attached by bolts 62 to said side 40, projecting outwardly from the latter to provide bars to hold onto by those persons who are in danger outside of said capsule, as in deep water.

In order to provide a foot passage between a place of danger, such as a burning building B shown in said FIG. 1, said capsule 36 is provided with an escape means, namely a movable bridge 66 that is attached by pivot members 68 to said capsule floor 38 at one of said doors, 50, 52, 54, 56. When needed, this bridge may be swung from said rescue capsule outwardly until it rests on a window frame or other part of a building B, for instance, or on some other support or place, from which endangered persons and animals can travel over this bridge to the capsule. Said bridge 66 is supported in position of use by two ropes 72 and 74, spaced laterally apart, that are fastened to said capsule side 40. Hooks 76 and 78 at the outer end of said bridge may be used to attach the latter to a window frame or door of a building.

When persons reach the capsule they may climb by a ladder 80, that extends between the capsule floor 38 and the top 42, thus providing them with simple means to enter the helicopter, through said hatch opening 46 and said helicopter opening 18.

To effect a rescue of persons in a burning boat or in a burning building, for instance, said helicopter is flown to a point adjacent said boat or building, and said capsule is lowered by unwinding said cables 24, 26, 28 and 30 on said winches, until said capsule is at the desired height. Then said landing or bridge 66 is lowered until its free and rests on the side or other suitable part of a building, or a boat. Then persons in danger may enter said capsule by walking over said bridge 66 and enter through one of said doors. When the capsule is full, or has rescued all that are in danger, it is raised by said cables, bringing said projecting guide 44 through said helicopter opening 18, whereupon the cables are made fast on said winches, and the helicopter flown, with said capsule, to a safe place where the passengers may disembark.

Said capsule 36 may serve its purpose without using said bridge 66, as when it can directly and safely be landed on top of a building or deck of a boat, in which instance persons may directly enter the capsule through one or more of its said doors 52, 54, 56, and 58.

What I claim is:

1. A rescue capsule in combination with a helicopter, said capsule comprising;
   a floor,
   a top,
   a continuous side extending between the floor and top,
   at least one door in the side to provide access to the capsule,
   said top having an opening therethrough,
   a projecting member extending above the top having a continuous side enclosing the opening and defining a passageway leading from the opening,
   a cover for covering the open top of the projecting member,
   said helicopter having a floor having an opening therein of about the same size as said projecting member,
   winch means disposed adjacent the opening in the helicopter floor,
   and cable means extending through the opening in the helicopter floor from the winch means to the capsule top,
   wherein said winch means raises and lowers the capsule with the projecting member defining both a passageway to the helicopter when the capsule is at its top position and a guide for aligning the capsule with the projecting member extending into the opening in the helicopter floor.

2. A combination rescue capsule and helicopter as set forth in claim 1 wherein the capsule has a plurality of doors and further comprising a bridge movably fastened to the capsule side extending beyond the side and in line with one of the doors of the capsule.

3. A combination rescue capsule and helicopter as set forth in claim 1 wherein said winch means includes two winches disposed on opposite sides of the floor opening.

4. A combination rescue capsule and helicopter as set forth in claim 3 wherein said cable means comprises four equal length cables, each winch receiving two cables so that the four cables are disposed in four corners about the projecting member.

5. A combination rescue capsule and helicopter as set forth in claim 4 wherein each winch includes separate winch sections, one for each cable.

6. A combination rescue capsule and helicopter as set forth in claim 5 wherein the capsule has a plurality of doors and a bridge movably fastened to the capsule side extending beyond the side and in line with one of the doors of the capsule.

7. A combination rescue capsule and helicopter as set forth in claim 6 including a ladder in the capsule and stretchers in the capsule.

* * * * *